June 10, 1941.  P. L. GEER  2,244,772
GLASS ANNEALING LEHR
Filed Sept. 3, 1938  2 Sheets-Sheet 1
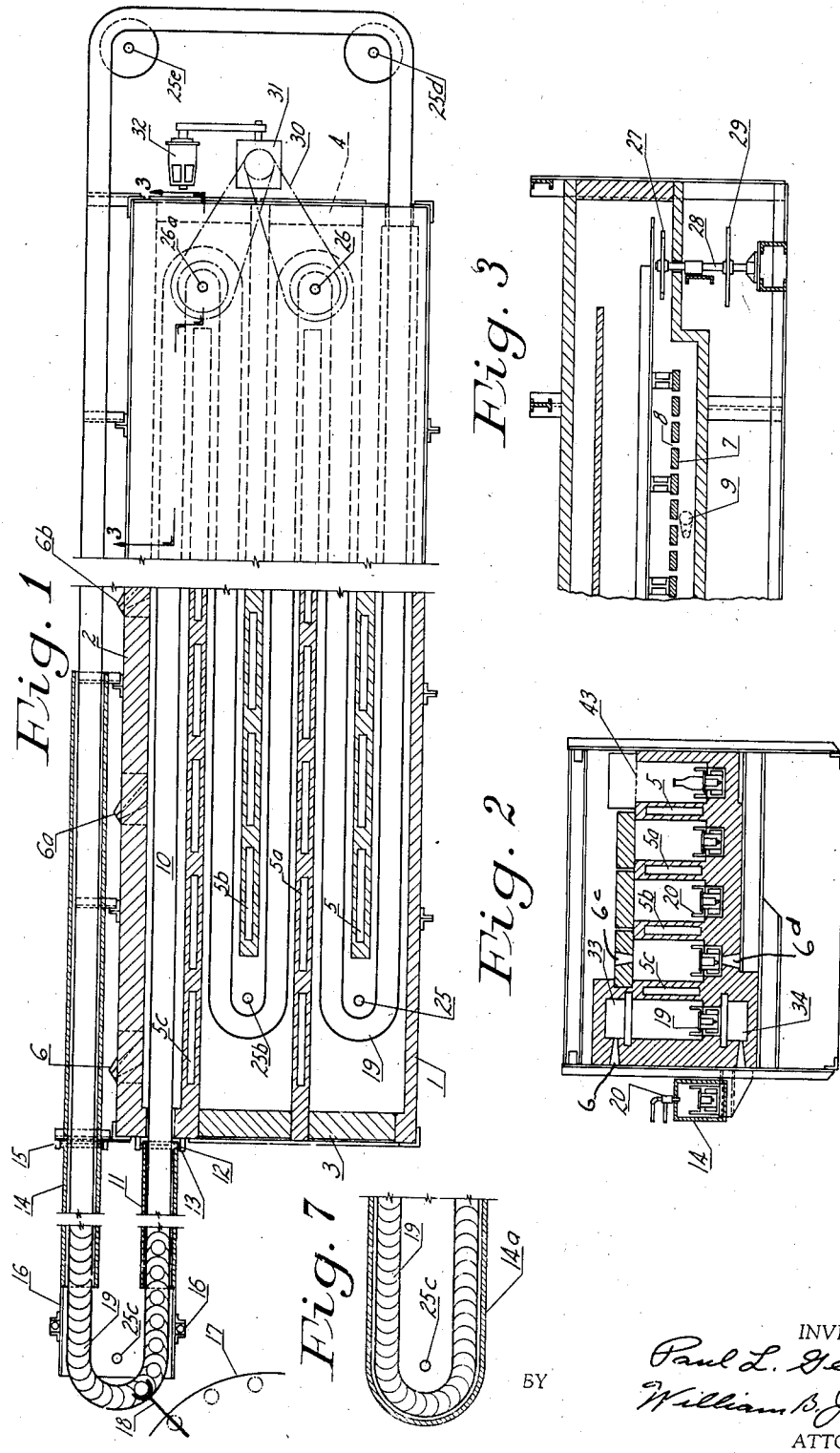
INVENTOR.
Paul L. Geer
William B. Jaspert
ATTORNEY.

June 10, 1941.  P. L. GEER  2,244,772
GLASS ANNEALING LEHR
Filed Sept. 3, 1938  2 Sheets-Sheet 2
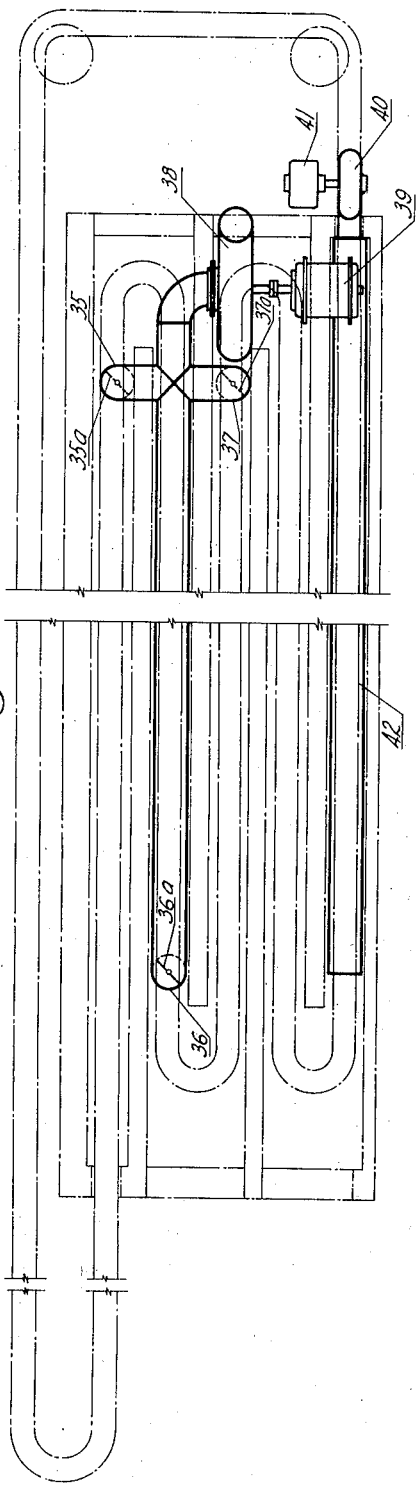
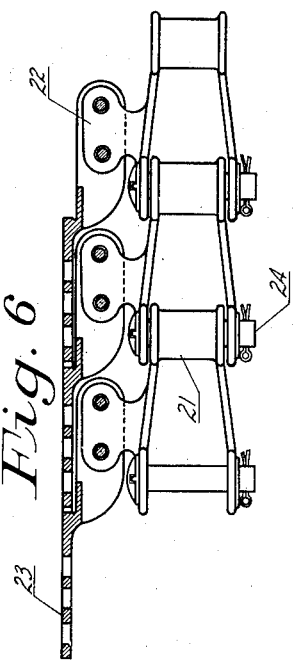
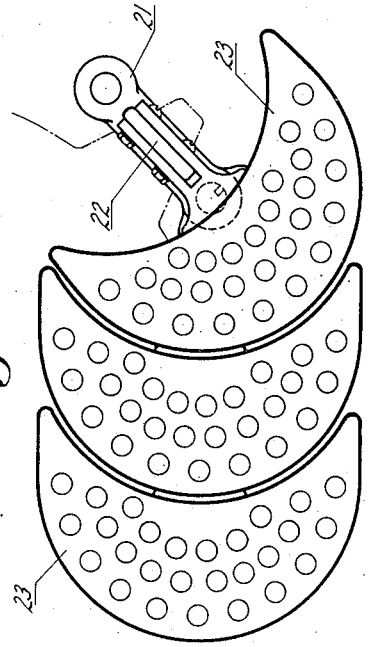
INVENTOR.
Paul L. Geer
William B. Jaspert
BY  ATTORNEY.

Patented June 10, 1941

2,244,772

UNITED STATES PATENT OFFICE 2,244,772

GLASS ANNEALING LEHR

Paul L. Geer, Pittsburgh, Pa., assignor to Amco, Incorporated, Pittsburgh, Pa., a corporation of Pennsylvania Application September 3, 1938, Serial No. 228,316

4 Claims. (Cl. 49—47)

This invention relates to new and useful improvements in glass annealing lehrs although the arrangement of annealing chamber and conveyor may be useful in the treatment of other articles such as the annealing of metal articles or the baking of enamels and lacquers on articles.

It is a primary object of the invention to provide a glass annealing lehr embodying a plurality of tunnel shaped treating chambers having their longitudinal axes in parallel relation and employing a continuous conveying means whereby the ware to be treated is conducted through all the treating chambers successively without removing the same from its conveying support.

Another object of the invention is the provision of a glass annealing lehr suited for both annealing and decorating glassware which is especially adapted for the control of the heat zones in the successive treating or annealing stages whereby each article is subjected to like treatment in its passage through the lehr structure.

A further object of the invention is the provision of a lehr of the above designated character in which the conveying means is extended to receive the ware direct from the ware forming machine and in which the conveyor portion adjacent or nearest the ware forming machine is adjustable relative to the height of the ware, whereby the need for stackers, so-called, is eliminated.

These and other objects of the invention will become more apparent from a consideration of the accompanying drawings constituting a part hereof in which like reference characters designate like parts and in which:

Fig. 1 is a top plan view partially in section of a glass annealing lehr embodying the principles of this invention;

Fig. 2 a vertical cross-sectional view thereof;

Fig. 3 a cross-sectional view taken along the line 3—3 of Fig. 1;

Fig. 4 a view diagrammatically illustrating the application of an exhaust manifold for the products of combustion and a blower for the application of a cooling medium at the cooling portion of the lehr;

Fig. 5 a top plan view of a plurality of conveyor sections;

Fig. 6 a side elevational view of the conveyor elements, with perforated plates of Fig. 5, showing the ware supporting plates in vertical cross-section; and Fig. 7 a top plan view partially in section of a portion of the conveyor and cover therefor.

With reference to Fig. 1 of the drawings, the structure therein illustrated comprises side walls 1 and 2 and end walls 3 and 4 with a plurality of partition walls 5, 5a, 5b and 5c. The partition walls extend short of the end walls as shown so as to divide the space between the side walls 1 and 2 in a series of communicating heat treating and cooling chambers, and the walls may be hollow to increase their heat retaining quality or to circulate a heating or cooling medium therethrough to prevent the heat from one tunnel being carried through the wall to another tunnel, in which event the air spaces will extend through the bottom and top walls. A plurality of burner ports 6, 6a and 6b are provided in the side wall 2 adjacent the charging end of the lehr through which a combustible mixture is introduced into the lehr chamber. Burner ports may also be provided at the top and/or bottom in the heating tunnel, as shown at 6c and 6d, Fig. 2. The burners may be many or few, depending upon the temperature curve desired and may be located above or below the conveyor, or in both places, and also in any compartment desired. The lehr may be of the open-fired or muffle type, as desired, a construction for the open-fired type being shown in Fig. 3 wherein the hearth wall 7 is provided with spaced openings 8 to permit the products of combustion from a burner 9 to pass upwardly to the treating chamber.

A charging chamber which is generally designated by the reference numeral 10 is provided with a tunnel-shaped extension 11 hinged at 12 to a plurality of lugs 13 extending from the lehr wall structure. A similar tunnel-shaped housing 14 is hinged at 15 to an extension bracket of the lehr housing and to tunnel ends 11 and 14 and supported on a vertically adjustable structure 16 to render the entire receiving portion of the lehr vertically adjustable relative to the ware forming machine 17 so that the ware transferred by the take-out mechanism 18 can be placed on the conveyor 19 without adjustment of the take-out mechanism or the ware-forming machine, the vertical adjustment of the hinge member being accomplished by jack-screws or in any other suitable manner.

The tunnel element 14 is provided with burners 20 for preheating the conveyor and also for drying the enamel or other decorating material applied to the ware if the lehr is employed both as a decorating and annealing lehr. If employed as a decorating lehr, the tunnels 14 and 11 extend completely around the curved end, as shown at 14a, Fig. 7.

As shown in Figs. 1 and 4, the conveyor 19 extends outside of the lehr at the discharge end and again returns to the charging end adjacent the side wall 2, these extended portions of the conveyor functioning to expose the ware to the atmosphere for a substantial distance of travel to facilitate inspection and removal for packing.

As shown in Fig. 2, angle bars 20a extend upwardly into the annealing chamber to prevent the ware from contacting the side walls and to provide a track over which the conveyor can slide, and the conveyor structure per se is as shown in Figs. 5 and 6, consisting of a chain 21 having upstanding brackets 22 to which are fastened perforated plates 23 of crescent shape, as shown in Fig. 5. As each upright 22 is integrally formed or joined to a link of the conveyor chain, it is subjected to a swivel movement around the hinge points constituted by the pins 24 so that in passing around a turn, as shown in Fig. 1 of the drawings, the plates are subjected to relative movement as shown from Fig. 5. Such movement is in no way detrimental to proper support of the ware as the latter cannot be disturbed, even though it is placed on the joint between adjacent plates, and by employing such a conveyor there is no need for transferring the ware from adjacent rows as it travels continuously through each successive tunnel chamber. As shown in Figs. 1 and 3, the endless conveyor 19 is mounted between a plurality of idle sprocket wheels, the axes of which are designated by the reference numerals 25, 25b, 25c, 25d and 25e, the axes 26 and 26a being those of driven sprocket wheels 27, Fig. 3, mounted on shafts 28, having a wheel 29 that is driven by sprocket chains 30 actuated through a common transmission 31 driven by motor 32.

As shown in Fig. 2 there is a top fire box 33 and a bottom fire box 34, either or both of which may be employed to maintain a suitable temperature environment in the annealing chamber, and as shown in Fig. 4 the products of combustion may be withdrawn at outlets 35, 36 or 37, each of which is controlled by dampers designated by the reference characters 35a, 36a and 37a. An exhaust fan 38 driven by a motor 39 withdraws the products of combustion from the flues and annealing chamber in accordance with the setting of the dampers 35a to 37a inclusive.

A blower for cold air designated by the numeral 40, driven by motor 41, is connected to a header 42 having perforations 43, Fig. 2, to permit the passage of cooling air downwardly into the last treating chamber of the lehr, the purpose of which is to accelerate cooling and to enable the ware to be handled for inspection and packing.

As hereinbefore stated, the lehr may be of the muffle type or open-fired type and may be heated at the top and/or bottom, in the initial of any other passage of the lehr. The lehr may be utilized for either decorating or annealing, the portion of the conveyor entering the tunnel 14 is loaded with the ware which is decorated before it is placed upon the conveyor or during passage of the conveyor through the open space between sprocket wheel 25e and the entrance to tunnel 14. While passing through tunnel chamber 14 it is dried by the application of heat through the burner 20. It then passes around into the annealing chamber 10 where it is subjected to a suitable annealing and firing environment. Where as hereinbefore pointed out, the ware is transferred to the endless conveyor from the forming machine 17, it is not decorated and need not be subjected to a preheat treatment, although it is the purpose to preheat the conveyor to the proper temperature to receive the hot glassware from the forming machine while passing through the outside tunnel portion 14.

The advantages of the above described method over the conventional single tunnel type, where glassware is placed on conveyors in rows, is that in the instant case each article is subjected to the same temperature environment and is not influenced by the heat of adjacent articles or temperature differentials between articles in the middle of the row, and those subjected to the influence of wall temperatures as in the prior art devices. This advantage improves the uniformity of the product. By utilizing a series of adjacent chambers, the straight-through passage of longitudinal drift, currents prevailing in the conventional form of tunnel, and known as draft, is greatly reduced. Also because of the more efficient control of temperature of each article passing through the lehr, and the fact that only a single line of glassware is being treated, makes it possible to not only heat the ware faster, but also cool it faster; therefore, the conveyor can be operated at greatly increased speed, thus increasing the annealing capacity of the device.

By means of the preheating chamber, the lehr can be effectively employed for both decorating and annealing. In the case of the former it prevents heating the conveyor to approximate temperature of the glassware as it is received from the forming machine. The form of conveyor as disclosed allows for the passage of the articles through both the preheating and drying zone, and annealing or firing chambers, without removing them from the conveyor and without transferring them from one conveyor to another as has been heretofore proposed.

Although one embodiment of the invention has been herein illustrated and described, it will be obvious to those skilled in the art that various modifications may be made in the details of construction without departing from the principles herein set forth.

I claim:

1. A glass annealing lehr comprising a plurality of relatively narrow annealing tunnels having their longitudinal axis in parallel relation and having the ends of adjacent tunnels in open communication, an endless conveyor for said tunnels adapted to support a single article of glassware in its transverse plane, heating means for some of said tunnels and positive cooling means for other of said tunnels, said heating and cooling means being arranged to constitute the tunnels into separate heating and cooling zones of gradually diminishing temperature in which the ware is subjected to a predetermined temperature gradient to initially heat the ware to annealing temperature and subsequently to a rapid cooling temperature after it has passed the critical annealing range.

2. An annealing lehr comprising a plurality of annealing tunnels of relatively narrow width with their longitudinal axes in parallel relation, said chambers being divided by partition walls terminating at their ends to establish communication of successive chambers, a preheat tunnel exteriorly of said annealing tunnels, an endless conveyor passing through the preheat and annealing tunnels, said annealing and preheat tunnels having separately controlled heating zones whereby the conveyor is preheated before receiving the glassware and the successive annealing tunnels are preferably each capable of maintaining a desirable temperature gradient and means for directing a cooling medium to the ware in its travel through the exit end of said lehr without disturbing the heat gradient in the preceding annealing stages of the ware travel.

3. An annealing lehr comprising side and end walls, a hearth and roof structure, partition walls extending from the end walls longitudinally therein with alternate partitions terminating short of the end walls, said partition dividing the lehr into relatively narrow chambers with opposite ends of said chambers communicating with alternate adjacent chambers, an inlet and outlet passage for said lehr, an endless conveyor of relatively narrow width passing through said partitioned chambers, regulable heating and cooling means for said partitioned chambers arranged to maintain predetermined temperature zones of gradually reducing temperature in said chambers, said heating and cooling means being arranged to constitute the successive annealing chambers separately regulable temperature zones.

4. An annealing lehr comprising side and end walls, a hearth and roof structure, partition walls extending from the end walls longitudinally therein with alternate partitions terminating short of the end walls, said partition dividing the lehr into relatively narrow chambers with opposite ends of said chambers communicating with alternate adjacent chambers, an inlet and outlet passage for said lehr, an endless conveyor of relatively narrow width passing through said partitioned chambers, regulable heating means for said partition chambers to maintain a desirable temperature gradient in the successive partitioned chambers and means for directing a cooling blast to the partition chamber which constitutes the exit passage of the ware through the lehr.

PAUL L. GEER.